March 10, 1970   H. G. HIRSBRUNNER   3,500,058
ELECTRO-THERMAL SWITCH
Filed July 9, 1968
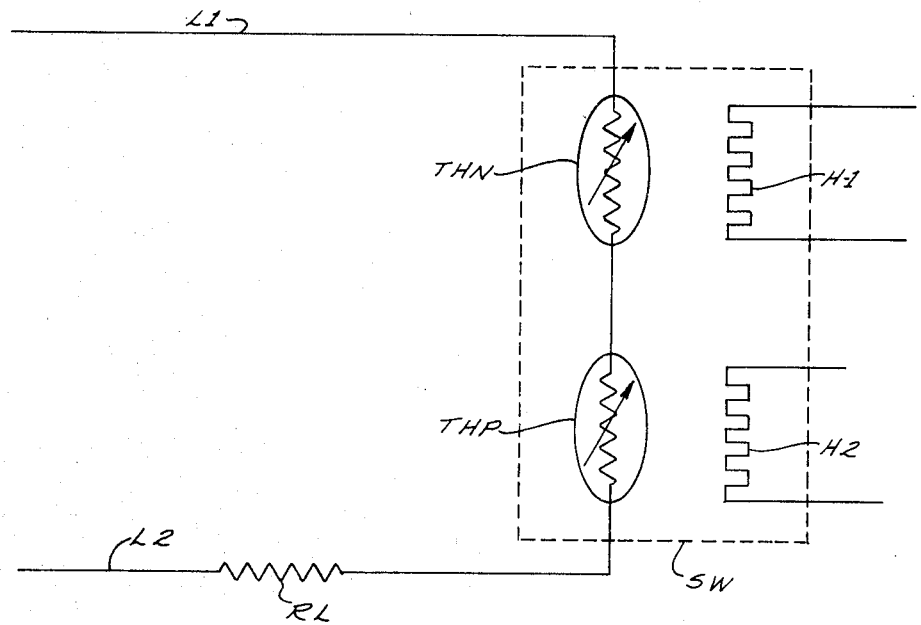

United States Patent Office 3,500,058
Patented Mar. 10, 1970

3,500,058
ELECTRO-THERMAL SWITCH
Hans G. Hirsbrunner, Attleboro, Mass., assignor to Texas Instruments Incorporated, Dallas, Tex., a corporation of Delaware
Filed July 9, 1968, Ser. No. 743,398
Int. Cl. H01h 37/02
U.S. Cl. 307—117                                       2 Claims

ABSTRACT OF THE DISCLOSURE

Apparatus is disclosed in which a pair of thermistors of opposite temperature coefficient types are interconnected for regenerative self-heating thereby to function as a bistable switch for controlling the energization of an electrical load in response to thermal control signals.

---

This invention relates to electro-thermal switching and more particularly to a bistable electro-thermal power switch.

In various situations it is desired to control the energization of an electrical load in response to changes in thermal or temperature conditions. Typically, changes in temperature have been sensed by a thermostat or thermistor and the signal thereby obtained has been amplified by means of a relay or active semiconductor current switching device to a level suitable for controlling the energization of the load. Systems operating in this way frequently require a large number of relatively expensive components and may require that separate power supplies or voltage sources be provided for the control circuit and the load circuit.

Among the several objects of the present invention may be noted the provision of apparatus for controlling the energization of an electrical load in response to thermal signals; the provision of such apparatus which provides such control without converting or transducing the thermal signals to intermediate electrical control signals; the provision of such apparatus which does not necessarily require the use of electric power amplifying components such as transistors, SCR's and relays; the provision of such apparatus which is highly reliable; and the provision of such apparatus which is relatively simple and inexpensive. Other objects and features will be in part apparent and in part pointed out hereinafter.

Briefly, switching apparatus according to the present invention is operative to control the energization of an electrical load from a source which provides a substantially predetermined source voltage, the load when energized being operative to draw a substantially predetermined load current from the source. The apparatus includes an NTC thermistor of the type having a transition temperature above which the resistance of the thermistor decreases relatively abruptly, thereby providing an incremental negative resistance characteristic, and includes also a PTC thermistor of the type having a transition temperature above which the resistance of the thermistor rises relatively abruptly, thereby also providing an incremental negative resistance characteristic. The NTC and PTC thermistors are connected in series with the load across the source and means are provided for selectively applying heat to each of the thermistors. The load can be continuously energized by transitorily applying heat to the NTC thermistor to raise its temperature above a first predetermined threshold level thereby causing the NTC thermistor to self-heat regeneratively to a low value of resistance. The load can then be deenergized by transitorily applying heat to the PTC thermistor to raise its temperature above a second predetermined threshold, thereby causing the PTC thermistor to self-heat regeneratively to a high value of resistance and remain above that threshold long enough to allow the NTC thermistor to cool down below its threshold temperature.

The invention accordingly comprises the constructions hereinafter described, the scope of the invention being indicated in the following claims.

The accompanying drawing, which illustrates one of various possible embodiments of the invention, is a schemaitc circuit diagram of electro-thermal switching apparatus of this invention.

Referring now to the drawing, there is indicated at RL an electrical load the energization of which is to be controlled. Load RL presents a substantially predetermined load resistance or impedance to the switching circuitry described hereinafter. The load is connected in series with an electro-thermal switch SW of this invention across a pair of supply leads L1 and L2. As is explained in greater detail hereinafter, the operation of the electro-thermal switch SW depends only upon resistive heating within the elements connected in series with the load and thus the supply leads L1 and L2 can provide either A.C. or D.C. at a predetermined voltage, depending upon the requirements of the load.

The electro-thermal switch SW comprises a pair of thermistors THN and THP which are of opposite temperature coefficient types. The thermistor THN is of the NTC type, that is, it has a negative temperature coefficient of resistivity, and the thermistor THP is of the PTC type, that is, it has a positive temperature coefficient of resistivity. Further, each of these thermistors is of a so-called switching type, that is, it has a high value of coefficient above a respective transition or threshold temperature. In other words, the NTC thermistor THN has a transition threshold above which its resistance decreases relatively abruptly and the PTC thermistor THP has a transition temperature above which the resistance of the thermistor rises relatively abruptly. Both of the transition temperatures are substantially above the ambient temperatures in the environment in which switch SW is to be operated.

As is understood by those skilled in the art, thermistors which have high value thermal coefficients at certain temperatures can exhibit an incremental negative resistance characteristic at those temperatures. In other words, an incremental increase in applied voltage will cause an incremental decrease in the current flowing after the thermistor again reaches thermal equilibrium. Thermistors having such incremental negative resistance characteristics can be operated in a regenerative self-heating mode. In the case of PTC thermistors, regenerative self-heating occurs when a PTC thermistor in its high coefficient region of operation is energized at a substantially predetermined current level. The increased resistance which results from heating then causes even more heat to be produced by the $I^2R$ resistive conversion of current to heat. In other words, a run away or regenerative condition develops. In the case of an NTC thermistor, regenerative self-heating occurs when the thermistor, operated on its high coefficient region, is energized at a substantially predetermined voltage level. In such a situation, the decreased resistance which results from heating causes even more heat to be produced by the $V^2/R$ conversion of electric energy to heat. Again, a run away or regenerative condition develops.

The thermistors THN and THP are connected in series with each other and with the load resistance RL across the source voltage. Each of the thermistors is provided with an electric resistance heater, H1 and H2 respectively. These heaters provide a convenient means for selectively applying heat to the thermistors but it should be understood that other means of obtaining or applying heat to each thermistor may also be used in appropriate situations. Further, the heaters themselves may comprise thermistors and may form portions of other electro-thermal switching or logic circuits such as the output stages of the timers or sequencers disclosed in copending application Ser. No. 608,230, filed Jan. 9, 1967.

If it is initially assumed that the heaters H1 and H2 are deenergized so that the thermistors THN and THP are relatively cool, e.g., at normal ambient or room temperature, the application of a source voltage between leads L1 and L2 will not cause the load RL to be energized since the NTC thermistor THN is in a relatively high resistance condition. When the NTC thermistor THN is in its high resistance condition substantially the entire source voltage will appear across that thermistor and relatively little current will flow in the load circuit. As long as the thermistor THN remains relatively cool, this condition is stable in that the thermal coefficient of that thermistor is relatively low below its transition temperature. Regenerative heating can, however, be selectively initiated by transitorily energizing the heater H1 to warm the thermistor THN above a respective threshold temperature substantially equal to the NTC transition temperature. As the resistance of thermistor THN then decreases at a substantial rate, the amount of power resistively converted to heat increases until a run away or regenerative situation is achieved as described previously. Once the NTC thermistor THN starts to self-heat regeneratively, this heating will proceed until the NTC thermistor reaches a low value of resistance. Further, once regenerative self-heating is initiated, the NTC thermistor THN will reach and maintain its low resistance condition independently of the energization of the heater H1, the heat generated internally in the thermistor THN being sufficient to maintain it at the necessary high temperature.

When the NTC thermistor THN has reached a low value of resistance, substantially the entire source voltage will appear across the load resistance RL and thus the load is energized. Since the thermistor THN maintains itself in its low resistance state, the load will remain energized independently of the condition of the heater H1. Thus, the heater H1 need only to be energized transitorily to produce continuous energization of the load.

When the load RL is thus energized, a substantially predetermined current flows in the series circuit. As long as the PTC thermistor THP remains relatively cool, this condition is stable in that the thermal coefficient of the thermistor THP is relatively low below its transition temperature. However, regenerative heating of the PTC thermistor THP can be selectively initiated by transitorily energizing the heater H2 to warm thermistor THP above a respective threshold temperature substantially equal to the PTC transition temperature.

Once regenerative self-heating is initiated, the thermistor THP will self-heat independently of the energization of heater H2 and will reach a temperature at which the thermistor has a very high level of resistance. The high resistance of the PTC thermistor THP causes the current in the series circuit to fall to a low level and thus the load RL is deenergized. The low level of current in the series circuit also permits the NTC thermistor THN to cool down to its original high resistance state. The high resistance of the thermistor THN in turn terminates the regenerative heating of the PTC thermistor THP. Thus, the circuit resets itself to its original condition in which the load RL is deenergized, the NTC thermistor THN is cool and in a high resistance state, and the PTC thermistor THP is cool and in a low resistance state.

In summary, it can thus be seen that the load RL can be continously energized by transitorily energizing the heater H1 or otherwise heating the thermistor THN above the respective threshold level and that the load can then be deenergized by transitorily energizing the heater H2 or otherwise heating the PTC thermistor THP above its respective threshold level.

An example of this control apparatus was constructed in which the NTC thermistor had a room temperature resistance of 220,000 ohms, the PTC thermistor had a room temperature resistance of 400 ohms, and the load had a resistance of 2000 ohms. The NTC thermistor, the PTC thermistor and the load were connected in series across a 115 volt source. The circuit could be switched from one state to the other by applying approximately 400 milliwatts of power to the respective input heater. When the load was deenergized, the power dissipated therein due to the residual current in the circuit amounted to only 1.8 milliwatts, while the power dissipated in the load when it was in its energized state amounted to 3.2 watts.

In view of the above, it will be seen that the several objects of the invention are achieved and other advantageous results attained.

As various changes could be made in the above constructions without departing from the scope of the invention, it is intended that all matter contained in the above description or shown in the accompanying drawing shall be interpreted as illustrative and not in a limiting sense.

What is claimed is:

1. Switching apparatus for controlling the energization of an electrical load from a source providing a substantially predetermined source voltage, said load when energized being operative to draw a substantially predetermined load current; said apparatus comprising:

an NTC thermistor of the type having a transition temperature above which the resistance of said thermistor decreases relatively abruptly thereby providing an incremental negative resistance characteristic;

a PTC thermistor of the type having a transition temperature above which the resistance of said thermistor rises relatively abruptly thereby providing an incremental negative resistance characteristic;

means for selectively applying heat to each thermistor; and circuit means for connecting said NTC thermistor, said PTC thermistor and said load and series across said source whereby, with a voltage substantially equal to said source voltage across said NTC thermistor, said load can be continuously energized by transitorily applying heat to said NTC thermistor to raise its temperature above a first predetermined threshold level thereby causing said NTC thermistor to self-heat regeneratively to a low value of resistance and whereby, with said load current flowing through said PTC thermistor, said load can then be deenergized by transitorily applying heat to said PTC thermistor to raise its temperature above a second predetermined threshold level thereby causing said PTC thermistor to self-heat regeneratively to a high value of resistance.

2. Apparatus as set forth in claim 1 wherein said heat applying means comprises a respective electric heater for each thermistor.

References Cited

UNITED STATES PATENTS

| | | | |
|---|---|---|---|
| 3,054,978 | 9/1962 | Schmidlin et al. | 338—25 X |
| 3,199,087 | 8/1965 | Foglia | 307—310 X |
| 3,343,004 | 9/1967 | Oushinsky | 338—25 X |

ROBERT K. SCHAEFER, Primary Examiner

T. B. JOIKE, Assistant Examiner

U.S. Cl. X.R.

338—25